US009773477B2

United States Patent
Zhang et al.

(10) Patent No.: US 9,773,477 B2
(45) Date of Patent: Sep. 26, 2017

(54) REDUCING THE NUMBER OF SCALING ENGINES USED IN A DISPLAY CONTROLLER TO DISPLAY A PLURALITY OF IMAGES ON A SCREEN

(75) Inventors: Wujian Zhang, Sunnyvale, CA (US); Sreenath Kurupati, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/997,440

(22) PCT Filed: Dec. 29, 2011

(86) PCT No.: PCT/US2011/067728
§ 371 (c)(1),
(2), (4) Date: Apr. 1, 2014

(87) PCT Pub. No.: WO2013/101023
PCT Pub. Date: Jul. 4, 2013

(65) Prior Publication Data
US 2014/0204122 A1 Jul. 24, 2014

(51) Int. Cl.
*G09G 5/397* (2006.01)
*G09G 5/36* (2006.01)
(Continued)

(52) U.S. Cl.
CPC ............ *G09G 5/397* (2013.01); *G09G 5/363* (2013.01); *H04N 5/46* (2013.01);
(Continued)

(58) Field of Classification Search
CPC .... G09G 5/14; G09G 2340/125; G09G 5/395; G09G 2340/10; G09G 2340/12;
(Continued)

(56) References Cited

U.S. PATENT DOCUMENTS 5,001,469 A * 3/1991 Pappas et al. ................ 715/790
6,189,064 B1 2/2001 MacInnis et al.
(Continued)

FOREIGN PATENT DOCUMENTS

| KR | 10-0649891 B1 | 11/2006 | |
|---|---|---|---|
| KR | 100649891 | * 11/2006 | ............. H04N 5/262 |
| TW | 200939763 A | 9/2009 | |
| WO | 0028518 A2 | 5/2000 | |
| WO | 2013/101023 A1 | 7/2013 | |

OTHER PUBLICATIONS

International Search Report and Written Opinion received for PCT application No. PCT/US2011/067728, mailed on Sep. 17, 2012, 14 pages.

(Continued)

*Primary Examiner* — Maurice L McDowell, Jr.
(74) *Attorney, Agent, or Firm* — Jordan IP Law, LLC

(57) ABSTRACT

Methods and apparatuses to reduce the number of scaling engines used in a display controller that displays image content associated with a plurality of image sources on a screen are provided. A first multiplexer may receive image content from a plurality of storage devices, and select first image content from one of the plurality of image sources. A first scaling engine may process the selected first image content, wherein a plurality of multiplexers can receives an output of the first scaling engine and the image content from the plurality of storage devices, respectively. Each one of the plurality of multiplexers may output either the image content input to the multiplexer or the output of the first scaling engine depending on which image content was scaled by the first scaling engine. Additionally, a plurality of post-processors may perform additional post-processing on the output of the plurality of multiplexer, respectively.

12 Claims, 4 Drawing Sheets

(51) Int. Cl.
*H04N 5/46* (2006.01)
*H04N 21/414* (2011.01)
*H04N 21/426* (2011.01)
*H04N 21/431* (2011.01)
*H04N 21/4402* (2011.01)
*G06T 3/40* (2006.01)

(52) U.S. Cl.
CPC . *H04N 21/41407* (2013.01); *H04N 21/42653* (2013.01); *H04N 21/431* (2013.01); *H04N 21/440263* (2013.01); *G06T 3/40* (2013.01); *G09G 2340/0407* (2013.01); *G09G 2340/10* (2013.01); *G09G 2340/12* (2013.01); *G09G 2352/00* (2013.01); *G09G 2360/06* (2013.01); *G09G 2370/20* (2013.01)

(58) Field of Classification Search
CPC .......... G09G 5/363; G09G 5/397; G09G 5/36; G09G 5/00
USPC ......................................................... 345/634
See application file for complete search history.

(56) References Cited

U.S. PATENT DOCUMENTS

| | | | |
|---|---|---|---|
| 7,081,902 B1 * | 7/2006 | Crow | G09G 5/363 345/428 |
| 2007/0139559 A1 | 6/2007 | Neuman | |
| 2009/0225224 A1 | 9/2009 | Sung et al. | |
| 2009/0295834 A1 | 12/2009 | Macinnis et al. | |
| 2011/0097013 A1 * | 4/2011 | Choi | 382/275 |

OTHER PUBLICATIONS

International Preliminary Report on Patentability and Written Opinion received for PCT Patent Application No. PCT/US20111067728, mailed on Jul. 10, 2014, 8 pages.

European Search Report and Written Opinion received for PCT Application No. PCT/US2011/067728, mailed on Jul. 7, 2015, 8 pages.

* cited by examiner

REDUCING THE NUMBER OF SCALING ENGINES USED IN A DISPLAY CONTROLLER TO DISPLAY A PLURALITY OF IMAGES ON A SCREEN

BACKGROUND

Existing video systems can display various types of image content (such as video and graphics) on a specified portion of a screen at different resolutions and sizes. In existing video systems that use scaling engines to scale multiple images, videos and/or graphics for display on a screen, each image processing plane in the display controller may have a dedicated a scaling engine. However, having a scaling engine for each image processing plane in a display controller can be very costly and inefficient. Furthermore, a scaling engine for an image processing plane can be designed to process only video or graphics data, which may limit which image processing plane can be used to process a particular image content source. Accordingly, conventional video systems may be relatively inflexible.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Various implementations of this disclosure may provide apparatuses and methods to reduce the number of scaling engines used in a display controller that displays image content from a plurality of image sources display image content associated with a plurality of image sources on a screen.

Figure 1:
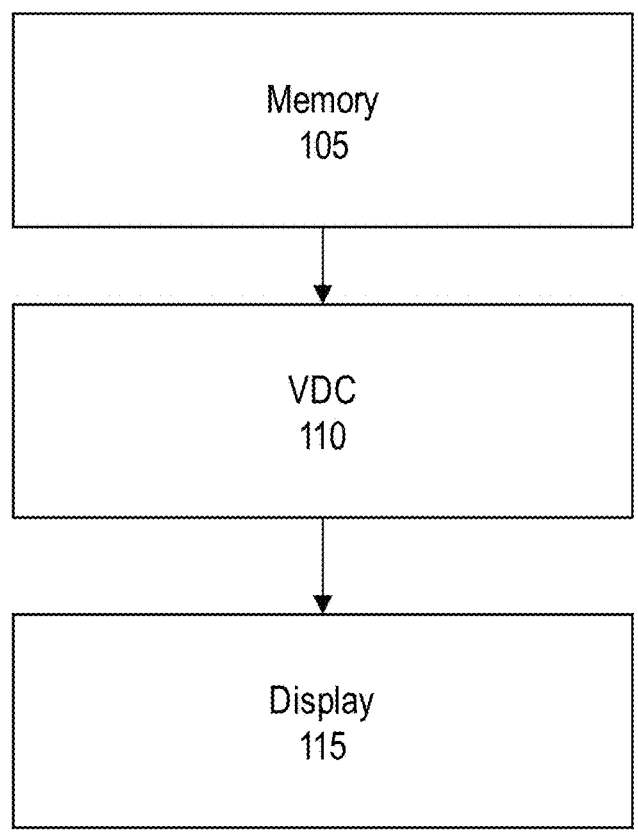
FIG. 1 is a block diagram illustrating an example video system operable to display image content associated with a plurality of image sources on a screen using one or more configurable scaling engines.

FIG. 1 illustrates an example video system 100 operable to display image content associated with a plurality of image sources on a screen using one or more configurable scaling engines.

The video system 100 can include memory 105 to store image content associated with a plurality of image sources to be displayed on a screen 115 and a video display controller 110 to scale the image content associated with the plurality of image sources for display on the screen 115.

Figure 2:
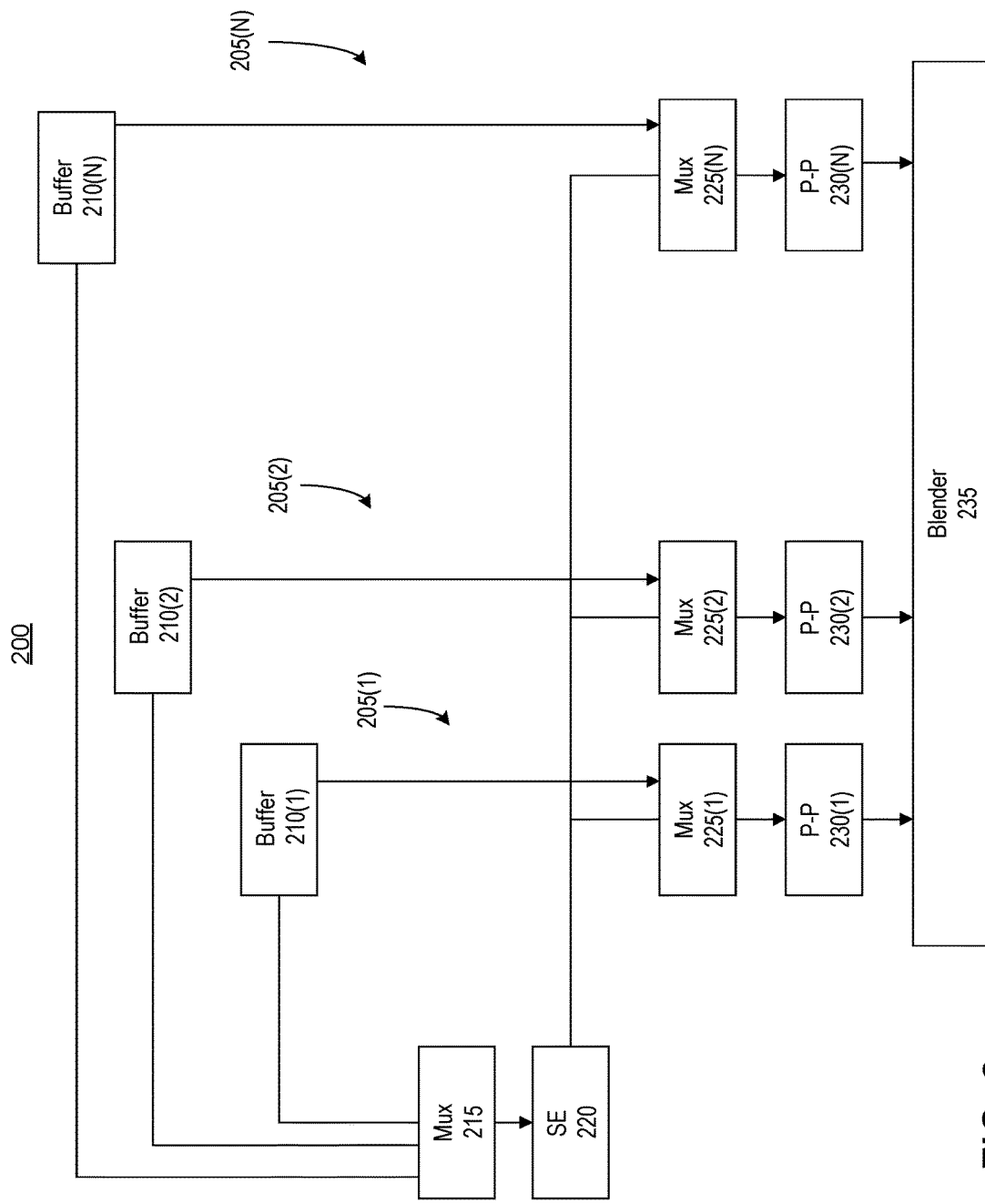
FIG. 2 is a block diagram illustrating an example video display controller for the video system of FIG. 1.

FIG. 2 illustrates an example video display controller 200 for the video system 100 of FIG. 1. The display controller 200 and its associated processes may be implemented in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

In particular, the video display controller 200 may include a plurality of image processing planes 205(1), 205(2), ..., 205(N), wherein each illustrated image processing plane 205(i), i=1, ..., N, includes a buffer 210(i) to hold image content. The image content stored in the buffer 210(i) may be read from a memory such as the memory 105 (FIG. 1), already discussed.

A first multiplexer 215 may receive the image content from the plurality of image processing planes 205(1), 205(2), ..., 205(N) and may select which image content to be processed by a scaling engine 220.

Each image processing plane 205(i) may further include a second multiplexer 225(i) to receive the image content stored in the buffer 210(i) and the output of the scaling engine 220. The second multiplexer 225(i) may output either the image content stored in the buffer 210(i) or the output of the scaling engine 220 depending on which image processing plane, i, was processed by the first multiplexer 215.

Each image processing plane 205(i) may further include a post-processor 230(i) to perform additional post-processing on the image content stored in buffer 210(i).

The illustrated display controller also includes a blender 235 that receives the outputs of the post-processors 230(i), i=1, ... N and merges the image content associated with the plurality of image sources for display on a screen such as the screen 115 (FIG. 1), already discussed. In some implementations, the output of the blender 235 may be input to the first multiplexer 215 to be selected to be processed by the scaling engine 220. In this case, the output of the scaling engine 220 is used for display on a screen.

By providing the example video display controller 200 of FIG. 2, the number of scaling engines used in a display controller to display image content associated with a plurality of image sources on a screen may be reduced. Furthermore, the scaling engines can be configurable to process a variety of image content (such as video and graphics content).

Computing devices contemplated to be within the scope of this disclosure include personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Figure 3:
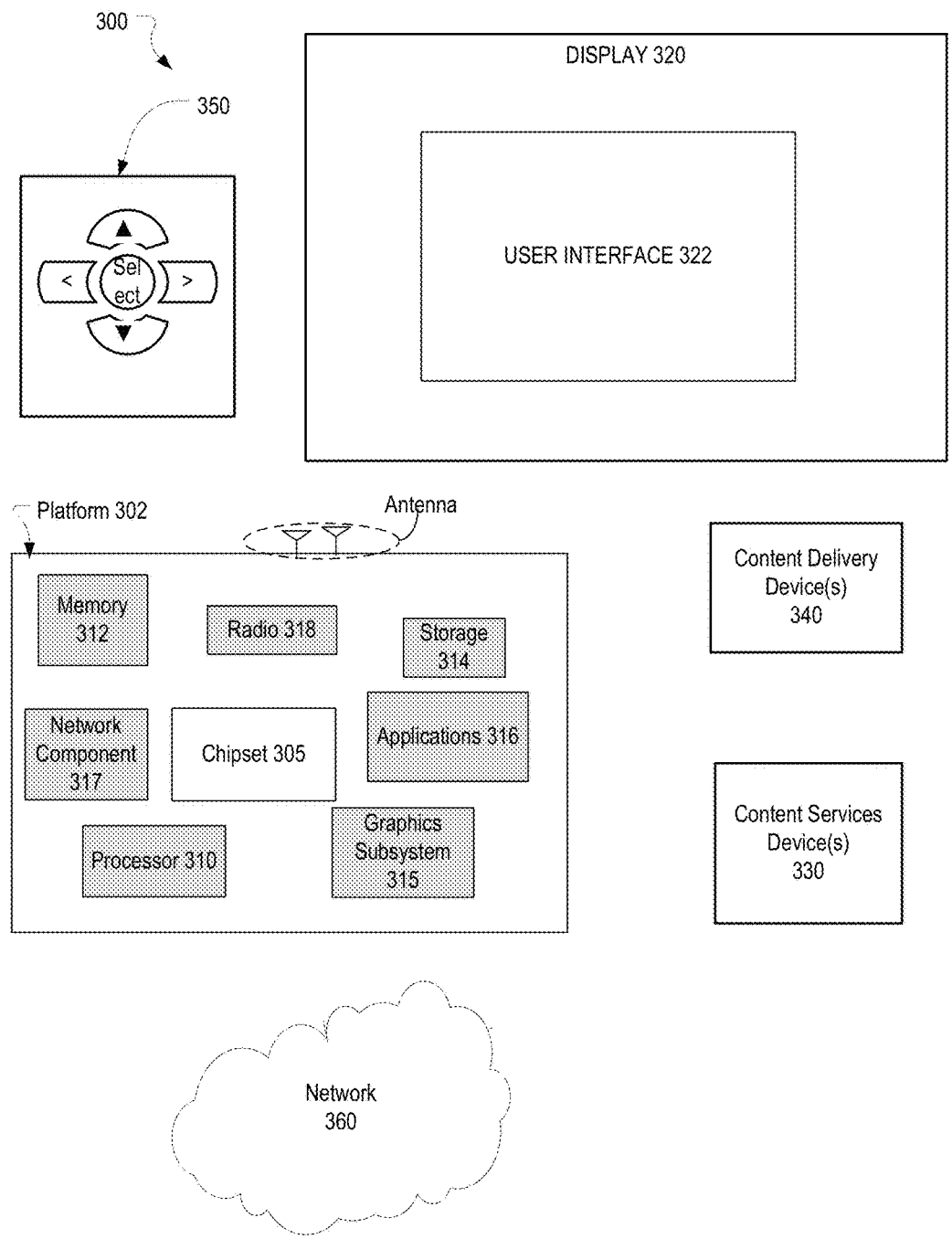
FIG. 3 is a block diagram illustrating an example system of this disclosure.

FIG. 3 illustrates an example embodiment of a system 300 of this disclosure comprising a platform 302, a display 320, content services device(s) 330, content delivery device(s) 340, and navigation controller 350. In embodiments, system 300 may be a media system although system 300 is not limited to this context. For example, components of system 300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 300 comprises a platform 302 coupled to a display 320. Platform 302 may receive content from a content device such as content services device(s) 330 or content delivery device(s) 340 or other similar content sources. A navigation controller 350 comprising one or more navigation features may be used to interact with, for example, platform 302 and/or display 320. Each of these components is described in more detail below.

In embodiments, platform 302 may comprise any combination of a chipset 305, processor 310, memory 312, storage 314, graphics subsystem 315, applications 316, network component 317, and/or radio 318. Chipset 305 may provide intercommunication among processor 310, memory 312, storage 314, graphics subsystem 315, applications 316 and/or radio 318. For example, chipset 305 may include a storage adapter (not depicted) capable of providing intercommunication with storage 314.

Processor 310 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 310 may comprise single-core or multi-core processor(s), single-core or multi-core mobile processor(s), and so forth.

Memory 312 may be implemented as a volatile memory device such as, but not limited to, a Random Access Memory (RAM), Dynamic Random Access Memory (DRAM), or Static RAM (SRAM). In some embodiments, memory 312 may be implemented as a non-volatile memory such as a flash memory device.

Storage 314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 314 may comprise technology to increase the storage performance enhanced protection for valuable digital media when multiple hard drives are included, for example.

Graphics subsystem 315 may perform processing of images such as still images or video for display. Graphics subsystem 315 may be a graphics processing unit (GPU) or a visual processing unit (VPU), for example. An analog or digital interface may be used to communicatively couple graphics subsystem 315 and display 320. For example, the interface may be any of a High-Definition Multimedia Interface, DisplayPort, wireless HDMI, and/or wireless HD compliant techniques. In embodiments, graphics subsystem 315 could be integrated into processor 310 or chipset 305. In embodiments, graphics subsystem 315 could be a stand-alone card communicatively coupled to chipset 305.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 318 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 318 may operate in accordance with one or more applicable standards in any version.

The network component 317 may include one or more network components capable of transmitting and receiving signals using various suitable wired and/or wireless communications techniques. Such techniques may involve communications across one or more wired and/or wireless networks. In communicating across such networks, network component 317 may operate in accordance with one or more applicable standards in any version.

In embodiments, display 320 may comprise any television type monitor or display. Display 320 may comprise, for example, a computer display screen, touch screen display, video monitor, television-like device, and/or a television. Display 320 may be digital and/or analog. In embodiments, display 320 may be a holographic display. Also, display 320 may be a transparent surface that may receive a visual projection. Such projections may convey various forms of information, images, and/or objects. For example, such projections may be a visual overlay for a mobile augmented reality (MAR) application. Under the control of one or more software applications 316, platform 302 may display user interface 322 on display 320.

In embodiments, content services device(s) 330 may be hosted by any national, international and/or independent service and thus accessible to platform 302 via the Internet, for example. Content services device(s) 330 may be coupled to platform 302 and/or to display 320. Platform 302 and/or content services device(s) 330 may be coupled to a network 360 to communicate (e.g., send and/or receive) media information to and from network 360. Content delivery device(s) 340 also may be coupled to platform 302 and/or to display 320.

In embodiments, content services device(s) 330 may comprise a cable television box, personal computer, network, telephone, camera, Internet enabled devices or appliance capable of delivering digital information and/or content, and any other similar device capable of unidirectionally or bidirectionally communicating content between content providers and platform 302 and/display 320 directly or via network 360. It will be appreciated that the content may be communicated unidirectionally and/or bidirectionally to and from any one of the components in system 300 and a content provider via network 360. Examples of content may include any media information including, for example, video, music, medical and gaming information, and so forth.

Content services device(s) 330 receives content such as cable television programming including media information, digital information, and/or other content. Examples of content providers may include any cable or satellite television or radio or Internet content providers. The provided examples are not meant to limit embodiments of the invention.

In embodiments, platform 302 may receive control signals from navigation controller 350 having one or more navigation features. The navigation features of controller 350 may be used to interact with user interface 322, for example. In embodiments, navigation controller 350 may be a pointing device, a control pad, a keyboard, or a touch screen device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 350 may be echoed on a display (e.g., display 320) by movements of a pointer, cursor, focus ring, or other visual indicators displayed on the display. For example, under the control of software applications 316, the navigation features located on navigation controller 350 may be mapped to virtual navigation features displayed on user interface 322, for example. In embodiments, controller 350 may not be a separate component but integrated into platform 302 and/or display 320. Embodiments, however, are not limited to the elements or in the context shown or described herein.

In embodiments, drivers (not shown) may comprise technology to enable users to instantly turn on and off platform 302 like a television with the touch of a button after initial boot-up, when enabled, for example. Program logic may allow platform 302 to stream content to media adaptors or other content services device(s) 330 or content delivery device(s) 340 when the platform is turned "off." In addition, chip set 305 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 300 may be integrated. For example, platform 302 and content services device(s) 330 may be integrated, or platform 302 and content delivery device(s) 340 may be integrated, or platform 302, content services device(s) 330, and content delivery device(s) 340 may be integrated, for example. In various embodiments, platform 302 and display 320 may be an integrated unit. Display 320 and content service device(s) 330 may be integrated, or display 320 and content delivery device(s) 340 may be integrated, for example. These examples are not meant to limit the invention.

In various embodiments, system 300 may be implemented as a wireless system, a wired system, or a combination of both. When implemented as a wireless system, system 300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 300 may include components and interfaces suitable for communicating over wired communications media, such as input/output (I/O) adapters, physical connectors to connect the I/O adapter with a corresponding wired communications medium, a network interface card (NIC), network controller (e.g. an Ethernet controller and ports (integrated or external), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 3.

Figure 4:
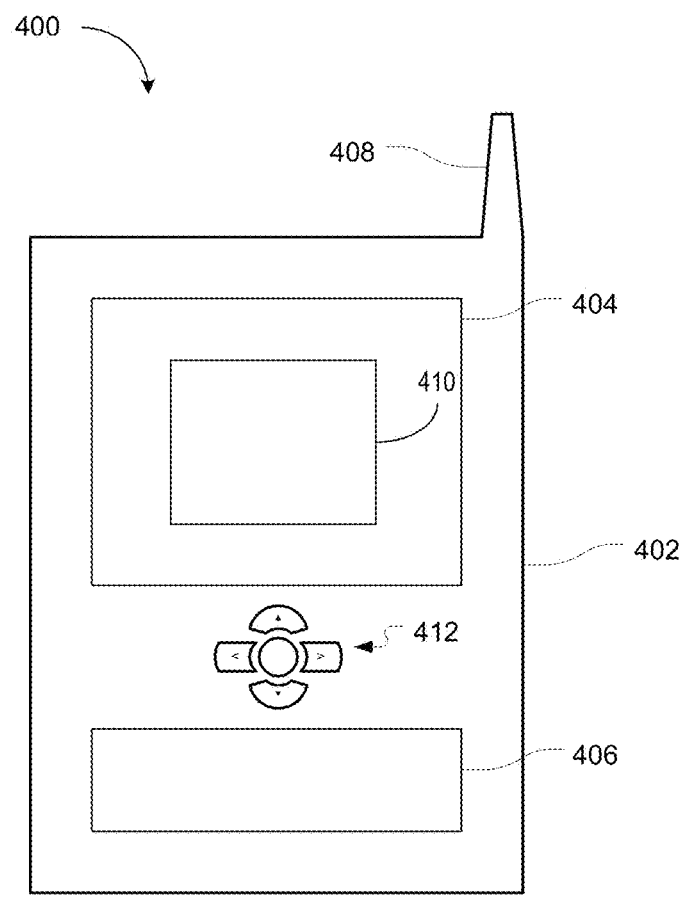
FIG. 4 is a block diagram illustrating an example small form factor device in which components of the system of FIG. 4 may be embodied.

As described above, system 300 may be embodied in varying physical styles or form factors. FIG. 4 illustrates embodiments of a small form factor device 400 in which components of system 300 may be embodied. In embodiments, for example, device 400 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 4, device 400 may comprise a housing 402, a display 404, an input/output (I/O) device 406, and an antenna 408. Device 400 also may comprise navigation features 412. Display 404 may comprise any suitable display unit such as a user interface 410 for displaying information appropriate for a mobile computing device. I/O device 406 may comprise any suitable I/O device for entering information into a mobile computing device. Examples for I/O device 406 may include an alphanumeric keyboard, a numeric keypad, a touch pad, input keys, buttons, switches, rocker switches, microphones, speakers, voice recognition device and software, and so forth. Information also may be entered into device 400 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, drivers, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor Embodiments may therefore include a system having a plurality of storage devices to store image content associated with a plurality of image sources, respectively. The system can also include a first multiplexer to receive the image content from the plurality of storage devices, and select first image content associated with one of the plurality of image sources. Additionally, the system may include a first scaling engine to process the selected first image content and generate a first engine output. Moreover, a plurality of multiplexers may receive the first engine output and the image content from the plurality of storage devices, respectively, wherein each one of the plurality of multiplexers outputs either the image content input to the multiplexer or the first engine output depending on which image content was processed by the first scaling engine. In addition, the system may include a plurality of post-processors to perform additional post-processing on the outputs of the plurality of multiplexers, respectively.

Embodiments may also include a method in which image content associated with a plurality of image sources is stored. Additionally, the method can provide for selecting first image content from one of the plurality of image sources to be processed, and processing the selected first image content to obtain processed first image content. The method may also involve processing remaining image content to obtain processed remaining image content, and merging the processed first image content and the processed remaining image content.

Other embodiments include an apparatus having logic to store image content associated with a plurality of image sources, and select first image content from one of the plurality of image sources to be processed. The logic may also process the selected first image content to obtain processed first image content, and process remaining image content to obtain processed remaining image content. Moreover, the logic can merge the processed first image content and the processed remaining image content.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A system comprising:
   a plurality of storage devices to store image content associated with a plurality of image sources, respectively, wherein each of the plurality of image sources is associated with one of a plurality of image processing planes, and the image content is to include video content and graphics content;
   a first multiplexer to,
      receive the image content from the plurality of storage devices, and
      select first image content associated with one of the plurality of image sources to yield a selected first image content and a first remaining image content, wherein the selected first image content is selected from a group consisting of video content and graphics content;
   a first scaling engine to process the selected first image content and generate a first engine output, wherein the first scaling engine is configured to process video content and graphics content;
   a plurality of multiplexers to receive the first engine output and the image content from the plurality of storage devices, respectively, wherein each one of the plurality of multiplexers outputs either the image content input to the multiplexer or the first engine output depending on which image content was processed by the first scaling engine;
   a plurality of post-processors to perform additional post-processing on the outputs of the plurality of multiplexers, respectively, wherein the plurality of storage devices, the plurality of multiplexers, and the plurality of post-processors are sequentially arranged to define the image processing planes; and
   a blender to receive and merge the outputs of the plurality of post-processors for display on a screen.

2. The system of claim 1, further including a display device to display an output of the blender.

3. The system of claim 1, wherein the scaling engine is configured to scale the selected first image content.

4. The system of claim 1, further including:
   a second multiplexer to,
      receive the image content from the plurality of storage devices, and
      select second image content from one of the plurality of image sources to yield a selected second image content and a second remaining image content, wherein the selected second image content is selected from a group consisting of video content and graphics content; and
   a second scaling engine to process the selected second image content and generate a second engine output, wherein the second scaling engine is configured to process video content and graphics content,
   wherein the plurality of multiplexers are configured to receive the first engine output, the second engine output, and the image content from the plurality of storage devices, respectively, wherein each one of the plurality of multiplexers output either the image content input to the multiplexer, the first engine output, or the second engine output depending on which image content was scaled by the first scaling engine and the second scaling engine.

5. A method comprising:
   storing, via a plurality of storage devices, image content associated with a plurality of image sources, wherein each of the plurality of image sources is associated with one of a plurality of image processing planes, and the image content is to include video content and graphics content;
   selecting, via one or more multiplexers, first image content from one of the plurality of image sources to be processed to yield a selected first image content and a remaining image content, wherein the selected first image content is selected from a group consisting of video content and graphics content;
   processing, via one or more scaling engines, the selected first image content to obtain a processed first image content, wherein the one or more scaling engines are configured to process video content and graphics content;
   processing, via a plurality of post processors, the remaining image content to obtain a processed remaining image content, wherein the plurality of storage devices, the one or more multiplexers, and the plurality of post-processors are sequentially arranged to define the image processing planes; and
   merging, via a blender, the processed first image content and the processed remaining image content.

6. The method of claim 5, wherein processing the selected first image content includes scaling the selected first image content.

7. The method of claim 5, further including displaying the merged image content.

8. The method of claim 5, further including processing the merged image content and displaying the result.

9. An apparatus comprising:
   logic to,
      store image content associated with a plurality of image sources, wherein each of the plurality of image sources is associated with one of a plurality of image processing planes, and the image content is to include video content and graphics content;
      select first image content from one of the plurality of image sources to be processed to yield a selected first image content and a remaining image content, wherein the selected first image content selected from a group consisting of video content and graphics content;

process the selected first image content to obtain a processed first image content, wherein the logic is configured to process video content and graphics content;

process the remaining image content to obtain a processed remaining image content, wherein storing the image content, selecting the first image content, and processing the remaining image content are to be arranged sequentially to define the image processing planes, and merge the processed first image content and the processed remaining image content.

10. The apparatus of claim 9, wherein the logic is to scale the selected image content.

11. The apparatus of claim 9, wherein the logic is to display the merged image content.

12. The apparatus of claim 9, wherein the logic is to process the merged image content and display the result.

* * * * *